UNITED STATES PATENT OFFICE.

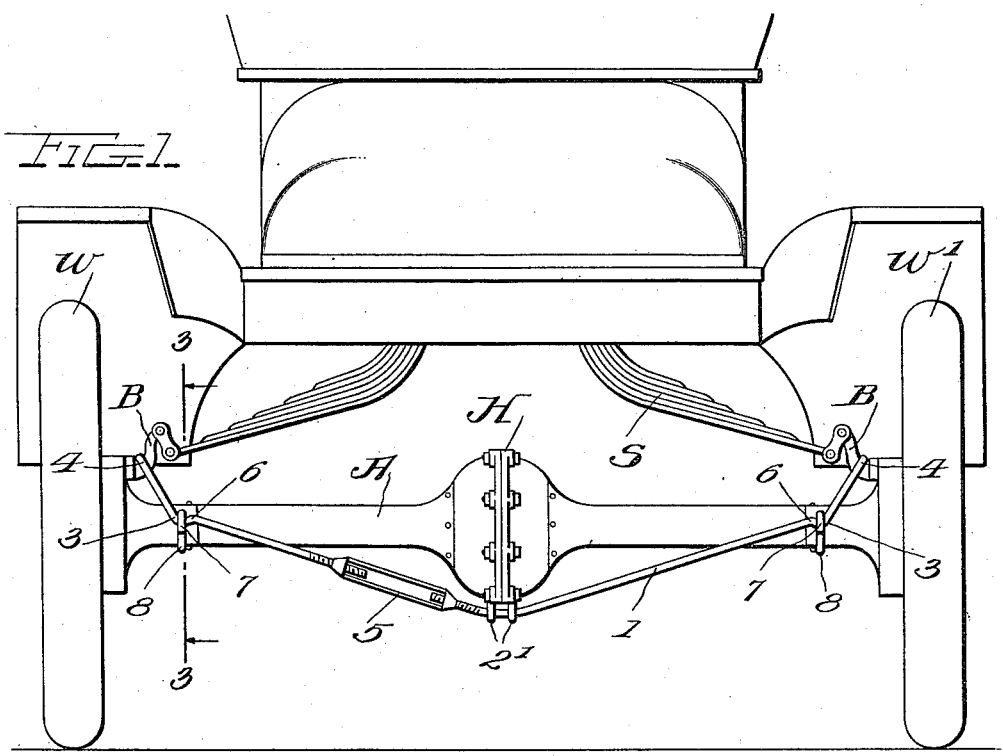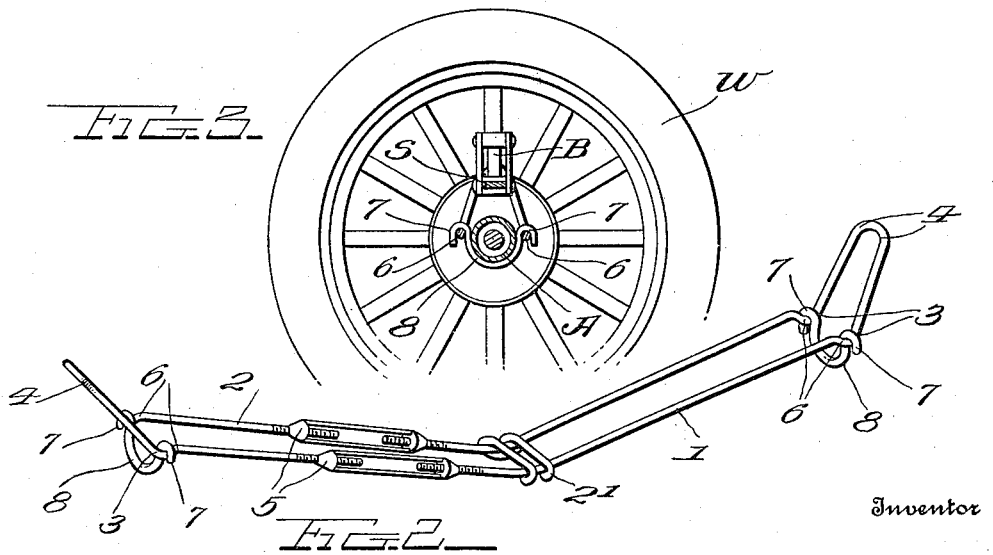

CHRISTIAN CHRISTIANSEN, OF SIOUX FALLS, SOUTH DAKOTA.

AXLE-TRUSS.

1,172,111.  Specification of Letters Patent.  Patented Feb. 15, 1916.

Application filed January 7, 1915. Serial No. 1,009.

*To all whom it may concern:*

Be it known that I, CHRISTIAN CHRISTIANSEN, a citizen of the United States, residing at Sioux Falls, in the county of Minnehaha and State of South Dakota, have invented certain new and useful Improvements in Axle-Trusses; and I do declare the following to be a full, clear, and exact description of the invention, such as will enable others skilled in the art to which it appertains to make and use the same.

My invention relates broadly to improvements in the running gears of vehicles and specifically to an improved form of truss designed more particularly for use upon the rear axles of Ford cars.

The object of the invention is to provide a comparatively simple and inexpensive device of this character which may be readily applied to any Ford machine and which will be extremely efficient when in use.

To the above end, I employ certain novel features of construction and combination hereinafter described and claimed and shown in the drawings wherein:—

Figure 1 is a rear elevation of a machine showing the application of the invention thereto; Fig. 2 is a perspective view of the invention detached; and Fig. 3 is a detail vertical section as seen along the plane of the line 3—3 of Fig. 1.

In this drawing, constituting a part of the present application, a portion of an automobile of the Ford type, is shown, this vehicle including the usual rear axle A whose ends are equipped with wheels W and W' and whose center is provided with a differential housing H. The ends of the axle A are further provided with upstanding brackets B by which the spring S is supported. It is the intention of the present invention to effectively truss the axle A to prevent its center from being depressed and to likewise prevent this axle from excessively vibrating as the machine is shocked and jarred in its passage over the road.

To the above end, a pair of truss rods 1 and 2 are shown, the central portions of these rods extending beneath the housing H while their opposite end portions are turned upwardly as seen at 3, are then bent laterally at 4 and integrally joined to each other. In the present instance, each of the rods 1 and 2 is shown as having a turn buckle 5 whereby it may be readily adjusted. Each truss rod is further equipped with a downwardly bent seat 6 near each of its ends, these seats receiving hooks 7 on a pair of U-shaped clips 8, which clips depend from said rods when the device is applied to use and snugly underlie the opposite ends of the axle A. When these clips stand in this position, the bent or looped ends 4 of the truss rods embrace the brackets B and contact with their outer sides as clearly shown in Fig. 1.

From the preceding description, when taken in connection with the accompanying drawing, it will be seen that the structure described may well be formed by properly bending two straight rods, one-half of each of these rods constituting half of the truss rod 1, while the other halves thereof constitute the two halves of the rod 2, which halves are connected by the turn buckles 5 as above set forth. In applying the device to use, it will be readily seen that tightening of these turn buckles 5 will place the rods 1 and 2 under tension, thus tending to raise their intermediate portions, said movement being resisted, however, by the U-shaped clips 8. It will therefore be clearly understood that considerable strain is relieved from the brackets B, and that most of such strain is in a downward direction, rather than directly inward, since were this the case, these brackets would undoubtedly be broken.

In connection with the truss rods 1 and 2, I also preferably provide a pair of spaced parallel transverse rods 2' joined at their opposite ends to said truss rods. These bars 2' have a slight longitudinal movement on said rods 1 and 2 and are adapted to underlie the differential housing and receive therebetween the flange of said housing. In this manner, the truss is correctly positioned relative to the axle A at all times, and in addition to this, these bars 2' prevent spreading of the truss rods 1 and 2.

When the preceding description is carefully considered in connection with the drawing, it is thought that such description will be ample for conveying a correct understanding of the invention to those skilled in the art to which the same relates. Furthermore, it will be evident that the device is extremely simple in construction, may be easily and inexpensively manufactured, and may be applied to any Ford machine.

In most cases, I intend to connect the truss rods 1 and 2 by a transverse spacing member 2', as most clearly seen in Fig. 2, but it will be evident that such rods could well perform their function without the use of such a member.

I claim:—

A device of the class described comprising a rod bent upon itself to form a pair of substantially parallel truss rods, each of said rods having a seat formed therein adjacent their adjoined end, said adjoined end beyond said seats being extended obliquely upward from said truss rods and adapted to overlie the spring hanger bracket, the opposite ends of said truss rods being bent upwardly to adapt the truss to underlie the differential casing, and threaded, a shorter rod bent upon itself to form a pair of substantially parallel truss rods, each of said rods having a seat formed therein adjacent their adjoined end, said adjoined end beyond said seats being extended obliquely upward from said truss rods and adapted to overlie the spring hanger bracket, the opposite ends of said truss rods being threaded, a pair of turn buckles adapted to coact with the threaded ends of said truss rods, U-shaped clips having downturned ends adapted to be received in said seats and designed to underlie the axle casing, and a pair of spaced parallel transverse bars joined at their opposite ends to the first mentioned pair of truss rods, and adapted to receive therebetween the flange of the differential casing.

In testimony whereof I have hereunto set my hand in presence of two subscribing witnesses.

CHRISTIAN CHRISTIANSEN.

Witnesses:
OLE THOMPSON,
JOHN WIEDMER.

Copies of this patent may be obtained for five cents each, by addressing the "Commissioner of Patents, Washington, D. C."